United States Patent [19]

Hepler

[11] Patent Number: 5,464,343

[45] Date of Patent: Nov. 7, 1995

[54] MULTITIP HOT RUNNER SYSTEM

[75] Inventor: Douglas C. Hepler, Rochester, N.Y.

[73] Assignee: Polyshot Corporation, Henrietta, N.Y.

[21] Appl. No.: 249,089

[22] Filed: May 25, 1994

Related U.S. Application Data

[63] Continuation of Ser. No. 982,473, Nov. 27, 1992, abandoned.

[51] Int. Cl.⁶ ................................................. B29C 45/22
[52] U.S. Cl. ...................... 425/549; 425/570; 425/572
[58] Field of Search ............................ 425/549, 568, 425/570, 572, 573, 190, 185; 264/328.15

[56] References Cited

U.S. PATENT DOCUMENTS

| | | | |
|---|---|---|---|
| 3,568,256 | 3/1971 | Johnson, Jr. | 425/570 |
| 3,758,252 | 9/1973 | Kohler | 425/570 |
| 4,034,952 | 7/1977 | Stewart | 425/572 |
| 4,921,708 | 5/1990 | Gellert | 425/568 |
| 5,217,730 | 6/1993 | Teng | 425/572 |

OTHER PUBLICATIONS

Excerpts from advertising materials of Mold Masters Limited believed to have been published in 1989.
Excerpts from advertising materials of enrietti System believed to have been published prior to the filing date of this application.

Excerpts form advertising materials of Spear System, Inc. believed to have been published prior to the filing date of this application.

Excerpts from advertising materials of DME believed to have been published prior to the filing date of this application.

*Primary Examiner*—Tim Heitbrink
*Attorney, Agent, or Firm*—Francis J. Caufield

[57] ABSTRACT

A multitip hot runner system for providing enhanced flexibility in the design, manufacture, and operation of multicavity molds. The system, which is self-contained, comprises a nozzle or manifold interface, externally heated flow passages, and interchangeable or replaceable tips. A fully hardened body permits a number of different multitip configurations all of which maintain uniform heating throughout the distribution architecture with the use of only a single thermocouple for temperature control.

12 Claims, 5 Drawing Sheets

MULTITIP HOT RUNNER SYSTEM

This application is a continuation of application Ser. No. 07/982,473 filed Nov. 27, 1992 now abandoned.

BACKGROUND OF THE INVENTION

1. Field of the Invention

This invention in general relates to the field of injection molding and in particular to self-contained hot runner systems.

2. Description of the Prior Art

In plastic injection molding processes, a thermoplastic or thermoset molding compound is first heated to plasticity in an injection cylinder at controlled temperature. Afterwards, the plasticized compound is forced from the cylinder through a nozzle by means of pressure generated within the cylinder. After emerging from the nozzle, the plasticized compound passes through a hole in a mold plate, usually stationary, and is then conveyed along a flow channel(s) to the mold cavity. The flow channel, depending on mold architecture, may comprise one or more sprue bushings and/or runner systems, which may or may not be heated for temperature control. Once in the cavity, the molten resin assumes the shape of the cavity and then is cooled to the point where it solidifies, acquiring the external shape of the cavity. The mold is then opened, and the part ejected or otherwise removed. The entire process is usually automated with clamping and unclamping of mold parts prior to injection and after part ejection, removal after cooling, taking place under the control of a microprocessor or other form of automated controller.

For best process performance regardless of part size, it is known to be beneficial to control the temperature of the plasticized compound more or less constant throughout its travel to the cavity. This reduces process problems associated with material degradation due to thermal variability, improves yield by decreasing scrap losses, and increases machine production time by reducing down time due to freeze offs.

However, while standardized in many respects, particularly with respect to mold base or plate thicknesses, present molding machinery does not always provide for precise temperature control to take advantage of its beneficial effects. Indeed, much of the available machinery is still run employing poor control techniques allowing the temperature of the resin to vary from the time it leaves the nozzle until it reaches a zone in the mold where temperature control is reacquired with, for example, internal heating channels in the mold.

Early on in mold practice, the most commonly used injection mold was one with a conventional runner system fed by a sprue. Such designs incorporated traditional unheated or cold sprue bushings to accept the melt delivered from the molding machine nozzle. Standard sprue bushings employed were available in a variety of styles and lengths to meet many anticipated molding applications. Such bushings, as those of more recent design, while unheated were provided with standard spherical radii and orifice sizes to be compatible with available nozzles configurations.

Here, the runner system was cut at the parting line to route plastic to the cavities. Full round runners were, and still are, the most efficient and popular because they afforded the least heat loss per unit volume of material flow. While offering an economical approach to mold construction, the conventional runner system was most frequently employed for short-run applications. Its major disadvantage is the requirement for degating parts and the need for regrinding of the runners and sprue, both labor intensive operations which do not readily lend themselves to automation.

Three plate molds were an improvement over the conventional mold approach in that they can automatically degate parts in the molding cycle and also allow the part to be gated on the top, usually a more desirable position for round parts. Because of the three plate scheme, two additional parting lines are available to allow automatic separation of the runner from the part. However, the three plate approach by itself afforded no additional advantage in terms of thermal control.

Consequently, no matter what type of molding strategy is employed, the runner and or runner and sprue system must still function to get the material to the cavity with a minimum of loss of temperature and pressure. To achieve this purpose, those in molding arts have employed a number of approaches.

One is the insulated runner mold. Very few of these are built today because other runnerless molding technologies perform much better than this type. They are interesting, however, for historical reasons. This mold design relied on a very thick runner system whose outside regions would solidify with heat loss to form insulation at the outside of the runner. Closer to the center higher temperature was maintained because of lower heat loss due to the outside insulating properties thus allowing the new melt to flow through the center in an open flow path. While easy to build, this style of mold was extremely difficult to run, particularly when cycle interruptions occurred. If new material was not frequently introduced into the system, the insulated runner would freeze, and the cull would have to be physically removed from the mold. As this was a frequent occurrence, the runner plates were latched together, and the machine clamping pressure was relied on to keep the plates from separating under injection pressure. While successful under some circumstances, like fast cycles and large shots using particular plastics, this type of mold largely is a thing of the past.

Next in terms of least expense for initial cost and continued maintenance is the internally heated runnerless molding system. In this system, material from the machine nozzle enters through a heated nozzle locator into the flow channel where heat is supplied to the plastic by a thermocouple cartridge heater located inside a distributor tube held in position by a end caps. Melt is distributed to probes or to secondary distributor channels through either round bores in solid plates or trapezoidal channels in split-plate designs. The molten plastic flows along the gate probe to the gate and into the cavity.

These type of systems are relatively insusceptible to material leakage. They are constructed of solid blocks with gun-drilled distributor channels. The distributor plates are retained with allen head cap screws of sufficient strength to withstand the molding injection pressures. Such systems are usually comprised of pre-engineered components with application information being supplied on varied mini-prints for the moldmaker to design an build a mold compatible with available styles. As plastic is heated from the inside out, less power is required than with externally heated systems. Probes, located near the gate, provide heat to provide thermal control at the gate, allowing drool-free molding without gate freeze-up. Cycle interruptions of up to five minutes are possible without freezing the gate in these type of systems.

3

Externally heated runnerless molding systems called manifolds are heated, with either round cartridges or cast-in heaters, to a temperature sufficient to keep the plastic being processed in a molten condition. The machine nozzle mates to a nozzle seat in the form of a replaceable contact area. Plastic flows from the molding machine, through the nozzle seat, to a lead-in channel, and then into a primary flow channel. The primary channel delivers the plastic to bushing drops. The flow channels are bored into the manifold to form channels for plastic to flow. Additional flow channels may connect, forming secondary or even tertiary flow paths before ending at bushing drop locations. Specific bushing diameters and flow channel sizes are recommended based on flow volumes and material viscosity. Thermocouples are located at several locations within the manifold to monitor temperature and provide feedback information for control purposes.

More sophisticated practice, apparently not yet universally accepted, recognizes the advantages of controlling temperature by employing hot sprue bushings to convey material from the nozzle to the cavity gate often times through the fixed mold plate, sometimes referred to as the "A" plate or base. A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

In multicavity applications capable of providing more than one part per molding cycle, hot sprue bushings and internally heated molds, including those employing manifolds, generally occupy a large percentage of mold real estate per cavity. Consequently, it is a primary object of this invention to provide a highly reliable self-contained hot runner system that will provide the art with flexibility in the design, manufacture and operation of multicavity molds.

It is another object of this invention to provide a multi-tip hot runner system that may have its tips easily replaced or changed for a different style.

It is yet another object of the present invention to provide a self-contained hot runner system with only one thermocouple and yet provide balanced temperature and pressure control throughout its delivery architecture.

It is yet another object of the present invention to provide a self-contained multitip hot runner system available in a variety of configurations employing varying numbers of tips.

It is yet another object of the present invention to provide a self-contained hot runner system having an interface for use with an injection machine nozzle or a manifold.

Other objects of the invention will, in part, be obvious and will, in part, appear hereinafter. A full understanding of the invention will best be had from reading the detailed description to follow in connection with the detailed drawings.

SUMMARY OF THE INVENTION

This invention relates generally to injection molding machinery and particularly to hot runner systems.

The invention is a multitip hot runner system for providing enhanced flexibility in the design, manufacture, and operation of multicavity molds of small overall footprint. The system, which is self-contained, comprises a nozzle or manifold interface, externally heated flow passages, and interchangeable or replaceable tips. A fully hardened body permits a number of different multitip configurations, all of which maintain uniform heating throughout the distribution architecture with the use of only a single thermocouple for temperature control. Configurations are provided in 2, 3, 4, 6, or 8 tip styles. Heating is via cartridges internal to the body with the number present depending on the tip configuration. In each case, each flow channel feeding a tip is heated on both sides to provide a delivery system that is balanced in both pressure and temperature so that part cavities are filled at the same rate and speed for part consistency and quality.

In addition, all interface surfaces in the system are flush mounted through the use of lapped mating surfaces to eliminate the need for "O" rings.

A pillar support is incorporated in the system to assure correct transfer of forces throughout the mold and to prevent the system from experiencing deleterious effects due to flexing under load.

Finally, the system may be used alone or with others combined in manifolds to furnish multiple multitip arrangements for large part throughput yet small area.

DESCRIPTION OF THE DRAWINGS

The structure and operation of the invention together with other objects and advantages thereof may best be understood by reading the following detailed description wherein the same reference numerals have been used throughout to designate the same part and wherein.

DETAILED DESCRIPTION

This invention comprises a fully self-contained hot runner system consisting of a nozzle or manifold interface, externally heated flow passages, and field replaceable tips. It employs a fully hardened distribution body that can be adapted for 2, 3, 4, 6, or 8 integrated tips or some other number if required. Heating is by internal cartridges placed within the hardened body. One zone of control monitors temperature via an independent thermocouple, which is located near a typical gate orifice and provides feedback to a well-known power controller for temperature control of all tips.

Figure 1:
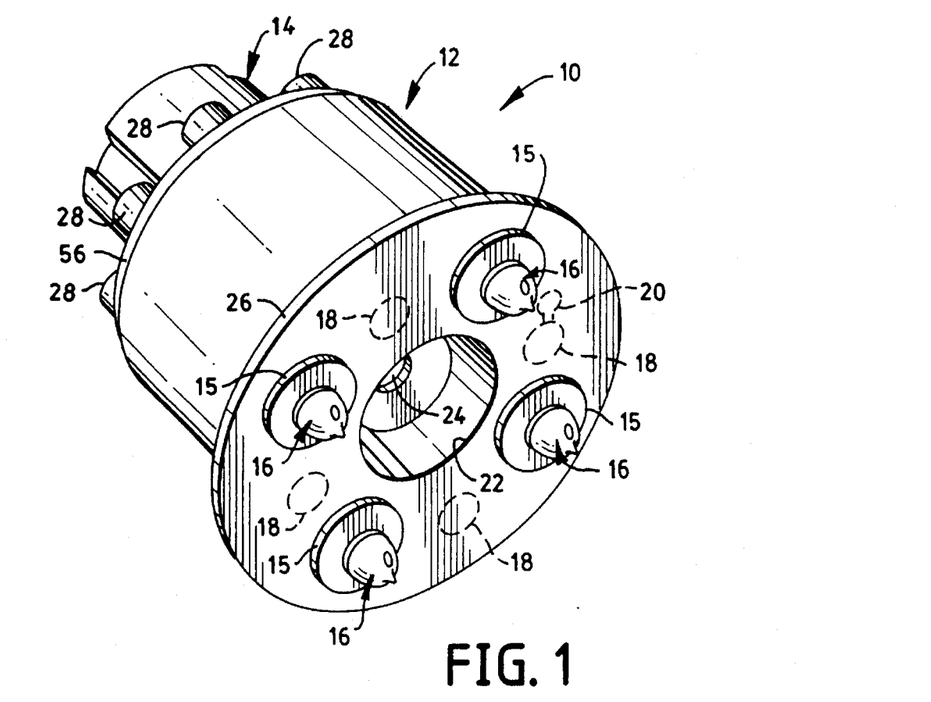
FIG. 1 is a diagrammatic perspective view of the multitip hot runner system of invention.

Referring now to FIG. 1, a four tip version of the inventive hot runner system is shown at 10. The four tip version is shown to illustrate the features and principles of operation common to all versions of the invention and is hereinafter referred to as "system 10". As can be seen, system 10, comprises three major parts: a generally cylindrical body 12, a manifold/nozzle interface 14, and a plurality of heat conducting tips 16 extending proud of the bottom of body 12 from which molten plastic is introduced to mold cavities via their gates as will become more readily apparent. Tips 16 are identical to one another so are to be considered typical in material composition and design in each of the embodiments of the invention. In preferred form, system 10 is approximately 6 inches high and has a diameter of approximately 5 inches.

Indicated in FIG. 1 as equally spaced dotted circles 18 are heating cartridges, one for each tip 16. The heating cartridges, which themselves are not shown and are not part of this invention, are resistance type elements of well-known design that operate preferably at 208 to 230 volts A.C. They are readily commercially available and can be fabricated to provide uniform or variable heating power throughout their length. Here, the heating elements preferably deliver uniform heating along their length.

The single dotted circle 20 represents the single thermocouple of the invention. In all versions of the invention, thermocouple 20, which is conventional and only diagrammatically shown, is placed as close to one of the tips 16 as space will allow so as to be able to closely monitor the temperature as near a tip as possible.

Figure 2:
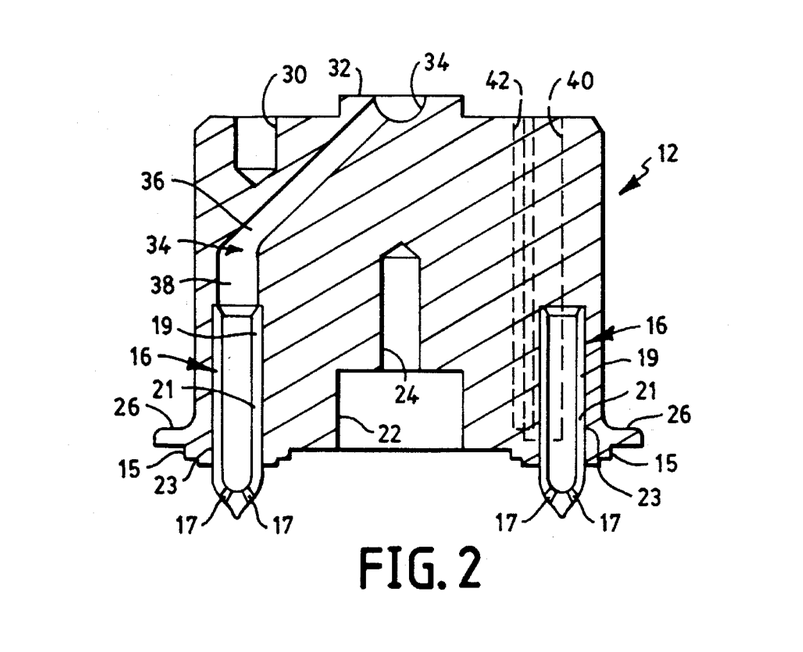
FIG. 2 is an diagrammatic cross-sectional elevational view of part of the invention of FIG. 1 taken generally along line 2—2 thereof showing only typical parts while omitting like parts in the section for purposes of clarity.
Figure 4:
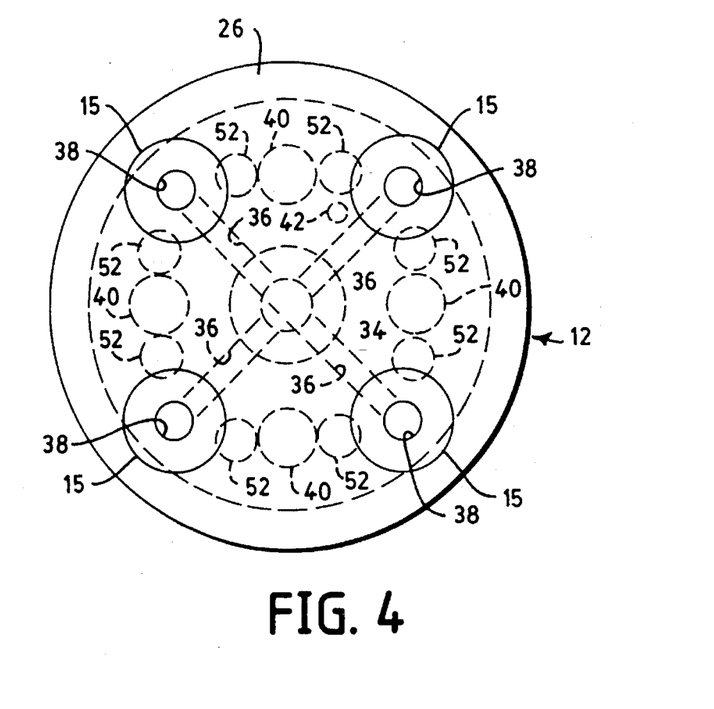
FIG. 4 is a diagrammatic bottom view of the invention of FIG. 1.

Body 12 is preferably constructed of fully hardened steel for strength and ruggedness and serves as the primary means for distributing plastic from the injection nozzle (see "70" in FIG. 7) to tips 16 as well as housing heating cartridges 18 and thermocouple 20. The hardened steel may be A10, S7, or P20. As best seen in FIGS. 2 and 4, the tip of body 12 is provided with an upwardly extending boss 32 whose top surface is provided with a lapped fit for reasons which will become apparent. Centered in boss 32 is a hemispherical well 34 that serves as a distribution chamber from which molten plastic is fed to the body 12's various flow channels. A typical unrestricted flow channel is illustrated at 34. Each flow channel 34 comprises an upper section 36 and lower section 38. Upper section 36 angles from distribution well 34 outwardly and downwardly from the center of body 12 until it meets lower section 38, which parallels the center of body 12. Thus, molten plastic which enters well 34 is equally divided among the various body flow channels 34 as it is conducted radially away from its center while traveling to the end of tips 16.

Each lower section 38 is threaded to receive a complementary threaded section of a tip 16. This is best seen FIG. 6 which shows that each tip 16 comprises a threaded head 19, a neck 21, which is reduced in diameter compared with the internal diameter of lower section 38 to provide an air gap 23 between them, and a pair of holes 17 through which molten plastic can flow. Tips 16 are preferably made of a material having high heat conducting properties such as beryllium copper or similar materials. Because of the equal spacing of flow channels 34, plastic from well 34 is equally distributed to each because all experience equal pressure, and the flow channels and tips are all of similar geometry so as to afford equal resistance to plastic flow.

As can be further seen in FIG. 2, each heating cartridge 18 fits into a corresponding hole shown typically at 40. Holes 40 begin in the top surface of body 12 and extend in length to just short of the bottom surface. Likewise, a hole 42 is provided to receive thermocouple 20. As best seen in FIG. 4, each heating cartridge heats one half of each flow channel so that every flow channel is heated from both sides for even heating. Moreover, it should be apparent that the relative and equal spacing of each flow channel with respect to each heating cartridge assures that each heating cartridge is heating the same thermal mass in each case. No matter how many tips are used in the invention, this principle is followed in every case to assure every flow channel is identically heated to every other. For convenience, this is done by using a circularly symmetric geometry, but the invention may be practiced with other geometries so long as this principle of equal distribution of heat is adhered to. With this in mind, it can now be seen that a single thermocouple can be used to control the temperature of every flow channel since all experience the same thermal environment.

Figure 3:
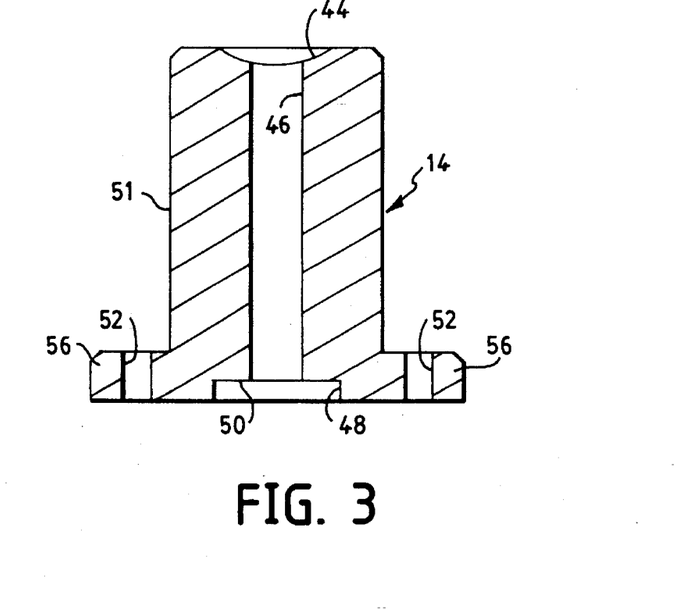
FIG. 3 is a diagrammatic cross-sectional elevational view shown of yet another part of the system of FIG. 1 taken generally along line 2—2 thereof.
Figure 5:
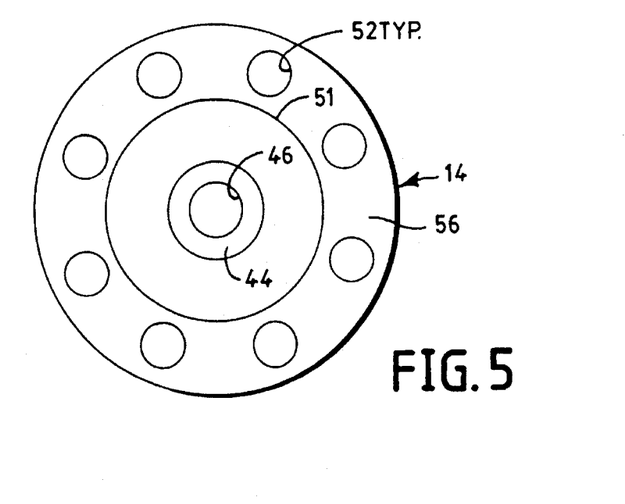
FIG. 5 is a diagrammatic top view of the invention of FIG. 1.

Referring now to FIG. 1 again in conjunction with FIGS. 3 and 5, it can be seen that the nozzle/manifold interface 14 comprises a main body 51, also of either A10, S7, or P20 steel, with a central flow channel 46. The entrance to flow channel 46 is in the form of a hemispherical depression 44 that is dimensioned to mate with standard ball diameters available on injection nozzles in use throughout the industry. The bottom of flow channel 46 terminates in a recess 48 having a bottom surface 50 that is lapped to mate with the lapped surface of boss 32. These two lapped surfaces mate exactly against one another to provide a tight seal which prevents plastic from leaking as it flow from channel 46 to well 34. Along with its other features, this one is also an important feature of the invention since it eliminates the need for the traditional "O"-rings in common use.

Interface 14 bolts to body 12 via a series of bolts 28 which pass through equally spaced holes 52 located in a flange 56 surrounding the bottom of interface 14 as best seen in FIGS. 3 and 5. Bolts 28 fit into corresponding holes 30 a typical one of which is shown in FIG. 2. As best seen in FIG. 4, bolts 28 are interspersed between heating elements 40 and flow channels 34 to retain interface 14 against body 12 and, importantly, so as to assure uniform thermal mass properties for equal heating.

All of the inventive multitip systems allow an integrated support pillar to be directly installed in modular form. This pillar (shown at 76 in FIG. 7) fully supports the mold cavity and safely transfers the molding machine nozzle force through the mold base assembly in a manner to be explained. With this feature, the multitip system allows the mold cavity to experience less flexing and hence last longer. For this purpose, it is seen in FIG. 1 and 2 that body 12 is provided with a support pillar recess 22 that is dimensioned to receive support pillar 76 so as to allow an air gap 96 (FIG. 7) between its interior surfaces and the exterior surfaces of support pillar 76 to provide thermal isolation between the two. In addition, support pillar 76 is made of a material relatively low in thermal conductivity compared with the A10 steel composition of body 12. This coupled with the thermal isolation of support pillar 76 from the remaining elements of system 10 assures that less thermal mass is presented to heating cartridges 18 than would otherwise be the case if body 12 were composed of solid A10 steel instead of support pillar 76.

Figure 7:
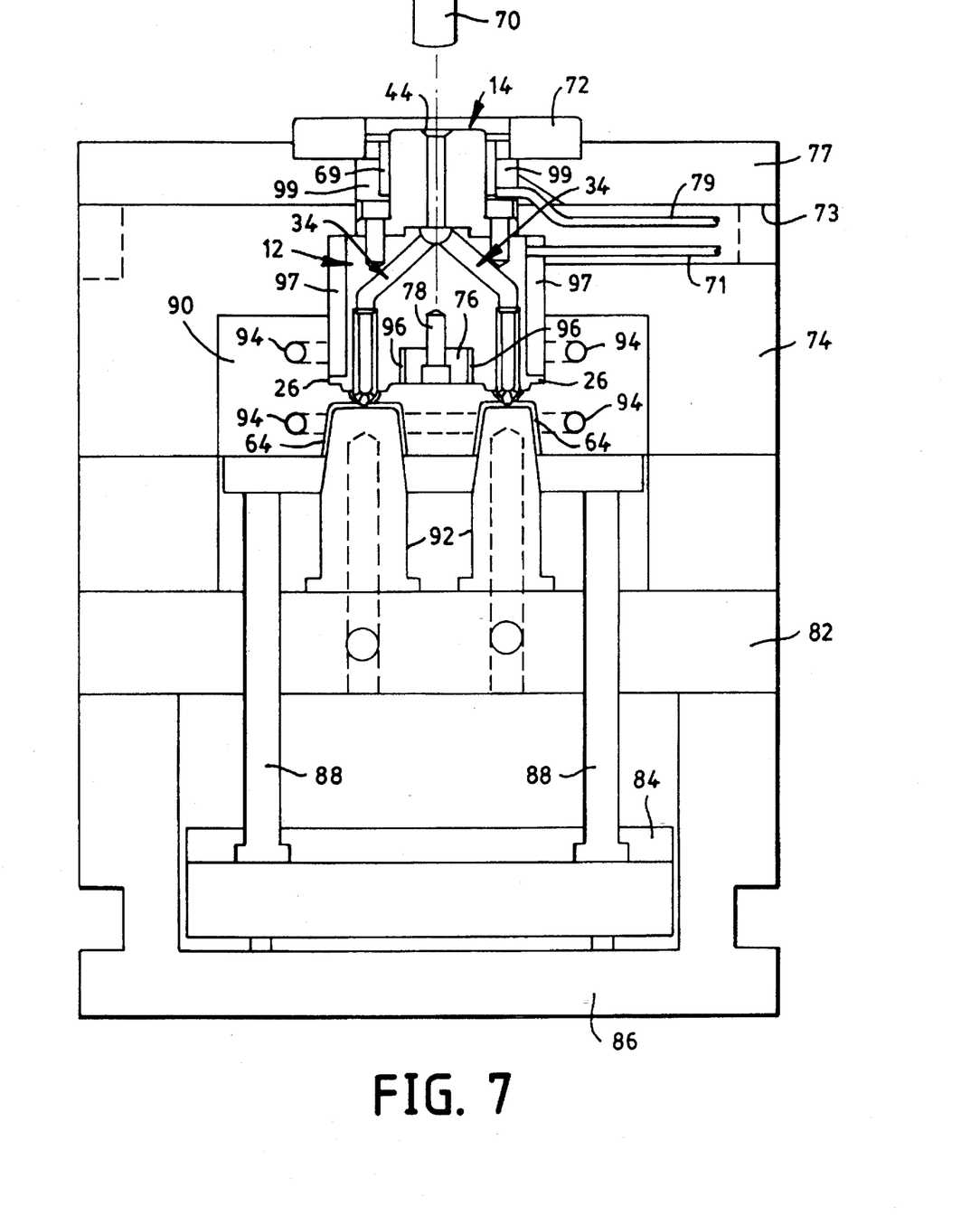
FIG. 7 is a diagrammatic elevational view showing the system of FIG. 1 in a molding system with some parts of each shown in section and others not.
Figure 8A:
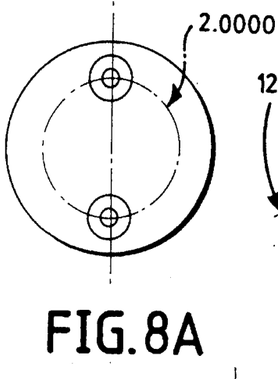
FIGS. 8A through 8E are bottom views of alternate multitip designs of the invention showing 2, 3, 4, 6, and 8 tip configurations, respectively.
Figure 8B:
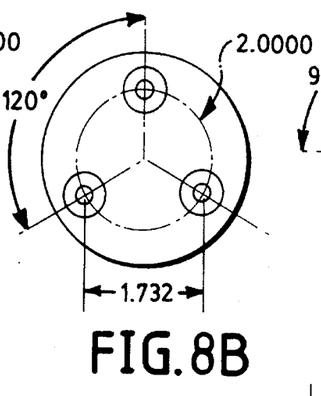
Figure 8C:
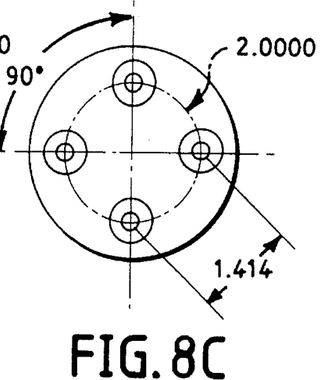
Figure 8D:
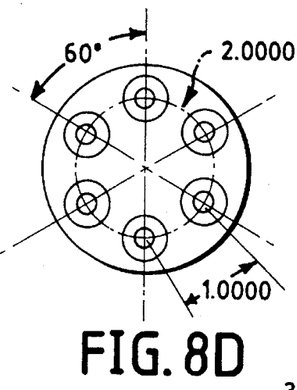
Figure 8E:
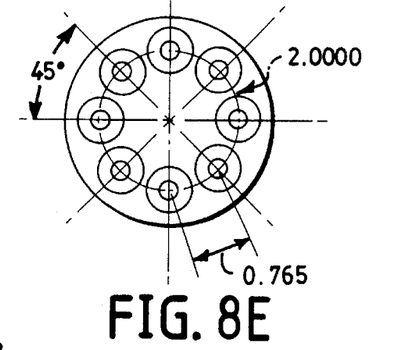

In the bottom of recess 22 is a bolt hole 24 which allows support pillar 76 to be bolted to body 12 via a bolt 78 as seen in FIG. 7.

All tips 16 are made of very high, thermally conductive material, as already mentioned. In addition, each tip 16 is provided with several coatings of wear and abrasion resistant plating to enhance their reliability and useful life. As can be appreciated, tips 16 because they are threaded in body 12 are easily replaced in the field by the user. The "P" or pinpoint style tips illustrated are recommended where minimal gate vestige is required.

Reference is now made to FIG. 7 which shows a typical mold layout with which multitip system 10 of the invention may be used. As shown, the mold layout from the top down comprises first the injection machine nozzle 70 which mates with recess 44 in the top of interface 14. This is surrounded by a mold locating ring 72 in turn located in top clamp plate 77. Other elements of the mold layout comprise the "A" plate 74, stripper plate 82, ejector retainer plate 84, ejector plate 86, ejector return pins 88, cavity block 90, cavity molds 92, typical, and cavity cooling lines 94. Also shown are part cavities, typically at 64. Wiring from heater cartridges 18 and thermocouple 20 are conducted from system 10 via a wiring race 73 in "A"-plate 74 where such wires are indicated generally at 71. An optional heater band 69 is shown surrounding interface 14. This is powered via a wire 79, also extending through race 73.

System 10 is shown partially in "A"-plate 74 and top clamping plate 77. It is thermally isolated from these mold elements via air gaps one of which is shown at 97 and the other at 99. Air gap 97 is formed in part by the spacing provided by a flange 26 located at the bottom of body 12 (See FIGS. 1 and 2 also).

It is also to be noted that each tip 16 emerges from the bottom of body 12 via corresponding bosses indicated typically by numeral 15. Bosses 16 assist in properly positioning system 10 in the mold layout so that tips 16 are properly aligned with mold cavity gates. In addition, their exit diameters are slightly larger that the reduced diameter necks 21 of tips 16 for reasons to follow.

Figure 6:
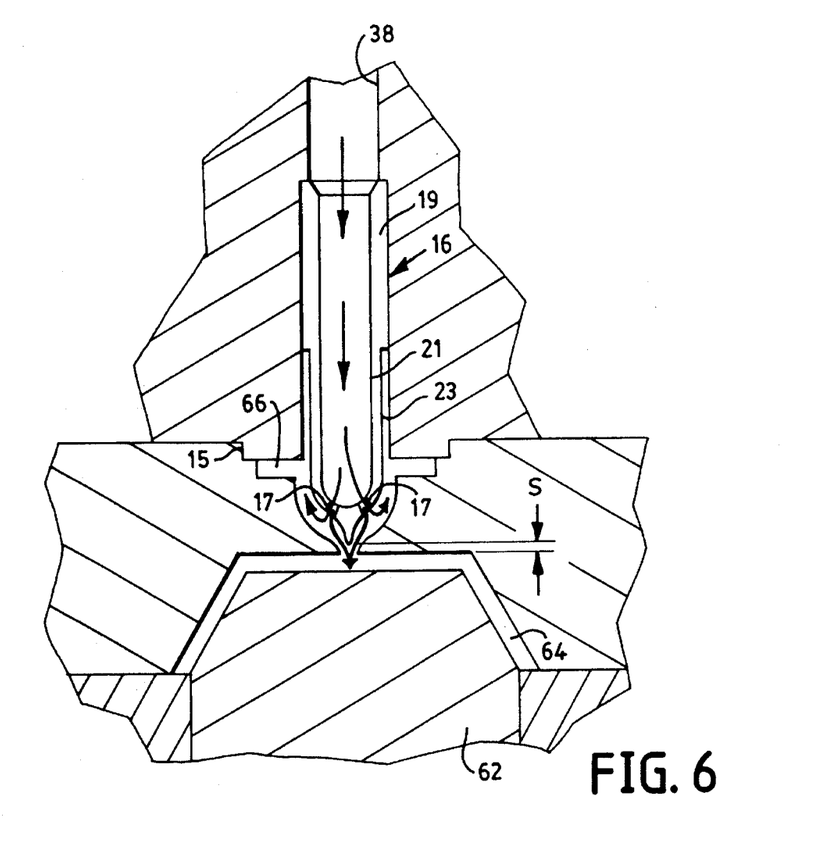
FIG. 6 is a diagrammatic sectional view of a part of the invention of FIG. 1 with parts broken away and shown in conjunction with other parts of a molding system (FIG. 7) in which the invention may be used where the parts of the molding system are also shown in elevational section with parts broken away.

Referring now to FIG. 6, there is illustrated in enlarged fashion more detail on how the tips 16 of system 10 mate with the gate of a cavity 64 formed between cavity block 60 and mold 62. As seen, boss 15 fits in registration with a complementary configured corresponding recess in cavity block 60. Also in block 60 is machined a well 66 for receiving molten plastic. Well 66 is shaped with a geometry similar to that of tips 16 but larger and slightly tapered as it approaches the cavity gate. The very end of tip 16 also is carefully kept away from the cavity gate by a distance, S, empirically determined to maintain flow and typically a few thousandths of an inch. Well 66 also communicates directly with air gap 23 formed in a manner previously described. As such, gap 23 and well 66 fill with molten plastic to provide additional thermal isolation between system 10 and the remaining elements of the mold. As heat is always conducted to the extreme end of tip 16 because of its high heat conducting properties and this is generally the location where temperature is monitored via thermocouple 20, gate "freeze" with system 10 very rarely can occur.

As mentioned earlier, multitip systems are available in several different versions as shown in FIGS. 8A through 8E. These various versions allow the mold designer to select the number of cavities to be filled per individual module. If required, it is also possible to use one multitip module with several tips injecting only one part. This is especially useful when critical part symmetry is required. In all versions, the principle of presenting equal thermal mass to each heating cartridge is strictly followed so that only one thermocouple is needed.

Figure 9:
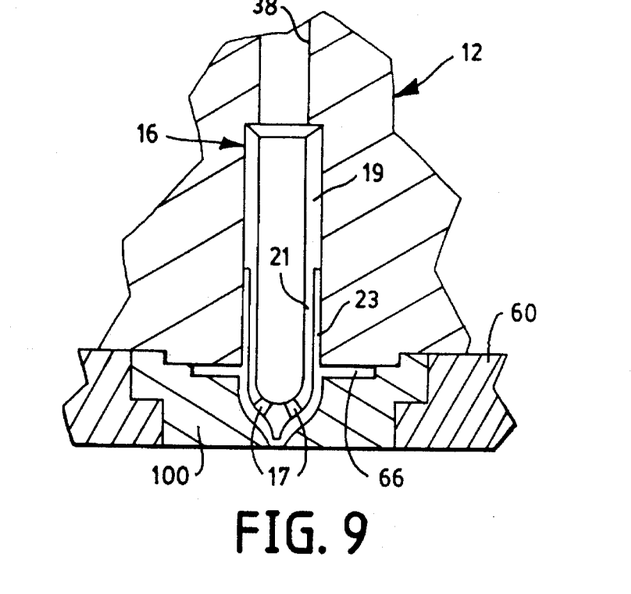
FIG. 9 is similar to FIG. 6 but shows an adapter with which the invention may be used.

FIG. 9 is very similar to FIG. 6 except for the appearance of an additional part in the form of an adapter 100. Adapter 100 may be used as a drop-in for preformed circular holes in cavity block 60 rather than machining the more intricate and difficult well 66 of FIG. 6.

Those skilled in the art may make changes to the invention without departing from the scope of its teachings. For example, it has already been mentioned that the multitip system of the invention may be used in different manifold configurations to maximize the number of part cavities in as small an area as possible. These include the single bar, H-style, star, single plate and bridge style. All of these type configurations constitute fully balanced material flow systems. This allows each part being molded to fill at the same rate of pressure and speed resulting in excellent shot-to-shot consistency, while at the same time, improving molded part quality. Therefore, it is intended that the embodiments described above be considered as illustrative and not be construed in a limiting sense.

What is claimed is:

1. A multitip hot runner apparatus for transporting molten plastic from an injection machine to a plurality of mold cavities while controlling the temperature of the molten plastic, said apparatus comprising:

a distribution body of given length and having a central longitudinal axis extending therethrough, said body having top and bottom surfaces, a distribution well formed in said top surface for receiving said molten plastic, a plurality of unrestricted and identically configured through flow channels formed between said distribution well and said bottom surface of said distribution body to transport said molten plastic from said well along said flow channels and toward said bottom surface, each of said flow channels having lower sections for releasably receiving tips for transporting said molten plastic beyond said bottom surface to gates of respective mold cavities, a plurality of heating cartridge holes equal in number to the number of said flow channels and equally spaced within said distribution body with respect to said flow channels so that each flow channel is surrounded in said distribution body by an identical thermal mass to assure uniform heating of said flow channels when heating cartridges are present in said distribution body and energized, said heating cartridge holes being non-through holes extending from said top surface of said distribution body to a predetermined length short of said distribution body given length, and a single non-through thermocouple hole, also extending from said top surface of said distribution body to a predetermined length short of said distribution body given length and near said bottom surface thereof, said thermocouple hole being closely adjacent one of said plurality of said flow channels;

a plurality of heating cartridges one each of which is disposed within said heating cartridge holes;

a thermocouple disposed in said thermocouple hole for monitoring the temperature near said bottom surface of said distribution body and supplying temperature feedback information for controlling the temperature of all of said flow channels;

a plurality of said tips for transporting said molten plastic, each of said tips being releasably connected in a respective one of said lower sections of said flow channels and forming therewith an air space to prevent heat loss, said tips being fabricated of a material with high heat conducting properties relative to those of said distribution body to conduct heat from said distribution body outside of said bottom surface thereof to prevent plastic freeze at cavity gates, and an interface body attached to said distribution body for receiving molten plastic and transporting it to said distribution chamber of said distribution body, said interface body being adapted to also retain said heating cartridges and said thermocouple within said distribution body and to be heated by said heating cartridges so as to maintain plastic therein in a molten state without the need for separate heating beyond that derived from said distribution body.

2. The apparatus of claim 1 wherein said tips are fabricated of beryllium copper.

3. The apparatus of claim 1 wherein said tips and said lower sections of said plurality of flow channels have complementary configured threads to allow said tips to be releasably screwed to said distribution body.

4. The apparatus of claim 1 wherein said interface body and said distribution body have complementary lapped mating surfaces to provide a seal between them for preventing molten plastic from escaping from said apparatus when said interface body is attached to said distribution body.

5. The apparatus of claim 1 wherein said interface body and said distribution body are both fabricated of hardened steel.

6. The apparatus of claim 1 wherein said interface body and said distribution body are both circularly symmetric.

7. The apparatus of claim 1 wherein said distribution body is fabricated of hardened steel selected from the group consisting of A10, P20, and S7.

8. The apparatus of claim 1 wherein said bottom surface of said distribution body further includes a recess for receiving a support pillar for transferring force loads from said interface body through said distribution body and onto external mold elements so as to prevent undesired flexing of the mold cavity to enhance its useful lifetime.

9. The apparatus of claim 8 further including a support pillar attached to said distribution body in said support pillar recess.

10. The apparatus of claim 9 wherein said support pillar recess and said support pillar have selected surfaces that are configured and arranged with respect to one another to form an air gap therebetween to prevent heat loss form said distribution body.

11. The apparatus of claim 10 wherein said support pillar is fabricated of a material that is relatively less heat conducting that the material from which said distribution body is formed to prevent heat loss and to reduce the overall thermal mass of the combination of said support pillar and said distribution body compared with what it would otherwise be if said support pillar were fabricated of the same material as that of said distribution body.

12. The apparatus of claim 1 wherein each of said heating cartridge holes is positioned for facilitating heating of each of said flow channels and each of said flow channels is positioned to be heated by two heating cartridges.

* * * * *